United States Patent [19]
Urbansky

[11] Patent Number: 5,276,688
[45] Date of Patent: Jan. 4, 1994

[54] CIRCUIT ARRANGEMENT FOR BIT RATE ADJUSTMENT

[75] Inventor: Ralph Urbansky, Schwaig, Fed. Rep. of Germany

[73] Assignee: U.S. Philips Corporation, New York, N.Y.

[21] Appl. No.: 989,744

[22] Filed: Dec. 10, 1992

Related U.S. Application Data

[63] Continuation of Ser. No. 711,239, Jun. 6, 1991, abandoned.

[30] Foreign Application Priority Data

Jun. 9, 1990 [DE] Fed. Rep. of Germany ....... 4018539

[51] Int. Cl.$^5$ ................................................ H04J 3/06
[52] U.S. Cl. ................................ 370/102; 370/105.3; 370/84; 375/118; 375/111
[58] Field of Search ............... 370/102, 84, 105.3, 370/108, 112; 375/118, 119, 120, 111, 112

[56] References Cited

U.S. PATENT DOCUMENTS

| | | | |
|---|---|---|---|
| 4,224,473 | 9/1980 | Kaul et al. | 370/102 |
| 4,791,652 | 12/1988 | McEachern et al. | 370/102 |
| 4,811,340 | 3/1989 | McEachern et al. | 370/102 |
| 5,067,126 | 11/1991 | Moore | 370/102 |

OTHER PUBLICATIONS

"Measured Pluse Stuffing Jitter in Asynchronour DS-1/Sonet Multiplexing with and Without . . . " Grover et al., Elec. Let. (1987) vol. 23, pp. 959–961.

Primary Examiner—Douglas W. Olms
Assistant Examiner—Min Jung
Attorney, Agent, or Firm—Steven R. Biren

[57] ABSTRACT

A circuit arrangement for adjusting the bit rates of two signals of which the higher bit rate signal is structured in frames, includes a buffer memory (2), a write counter and a read counter (6, 8) as well as a phase comparator (7) and a control circuit (10). With these modules the bits of the lower bit rate signal are arranged in the frames of the higher bit rate signal. In addition to these bits negative or positive stuff bits are also inserted in the frames. In order to avoid jitter when the lower bit rate signal is recovered at the receiver end, the phase different between the two signals is determined more accurately. This effected with a counter (55, 56) whose count is applied to the phase comparator (7) to determine the digits after the decimal point for the phase difference. Furthermore, a controller (9) is provided in an automatic control system (7, 10, 8) for controlling the clock for the read counter (8), to which controller the output signal of the phase comparator (7), as well as information about the number of positive or negative bits to be stuffed during the next stuffing operation, is applied.

2 Claims, 2 Drawing Sheets

CIRCUIT ARRANGEMENT FOR BIT RATE ADJUSTMENT

This is a continuation of application Ser. No. 07/711,239, filed Jun. 6, 1991 now abandoned.

BACKGROUND OF THE INVENTION

The invention relates to a circuit arrangement for adjusting the bit rates of two signals of which the signal having the higher bit rate is structured in frames, wherein the circuit arrangement comprises a buffer memory, a write counter and a read counter as well as a phase comparator and a control circuit for inserting positive or negative stuff bits between the bits of the lower bit rate signal.

Circuit arrangements for bit rate adjustment in information transmission systems are necessary, for example, in plesiochronous multiplexers which multiplex plesiochronous signals. Two binary signals are termed plesiochronous when their bit rates are nominally the same, but may in fact deviate from a nominal value within a given tolerance. Before plesiochronous signals can be multiplexed by a plesiochronous multiplexer, they all have to be brought to the same (10% higher) bit rate, for example, by means of a circuit arrangement having the features described above. The ratio of the input bit rate to the frame frequency denotes the number of bits of the lower bit rate signal which are to be inserted in a frame. If this ratio for the nominal value of the two magnitudes is an integer, two techniques can be distinguished: First the positive-zero-negative stuffing technique and secondly the positive-negative stuffing technique.

If in the first case the instantaneous clock frequency of the lower bit rate signal is equal to the nominal bit rate, all bits of this signal which arrive each second can be inserted in the frames of the higher bit rate signal, without the need for inserting positive or negative stuff bits (variable stuff bits are denoted here).

If in the second case the instantaneous clock frequency of the lower bit rate signal is equal to its nominal value, positive and negative stuff bits are inserted alternately.

A positive stuff bit refers to a bit without information content at a location usually carrying an information or data bit, whereas a negative stuff bit transmits a data bit to a location otherwise occupied by a fixed stuff bit. The fixed stuff bits are used for the coarse frequency adjustment and may contain additional and secondary information for the receiver.

In an article—to be referenced (1) in the following—by Grover et al. (Grover, W. D.; Moore, T. E.; McEachern, J. E.: Measured Pulse Stuffing Jitter in Asynchronous DS-1/Sonet Multiplexing with and without Stuff-Threshold Modulation Circuit, Electronics Letters (1987), Vol. 23, pp. 959 to 961), a circuit arrangement is described with which the above operations of stuff bit insertion can be performed. An arrangement of this type comprises an addressable buffer memory, in which a first signal is written by means of a write counter and from which a second signal is read out by means of a read counter. If the circuit is located at the transmitter end, the first signal is written into the buffer memory with a bit clock and the write counter is incremented with this clock. A control circuit drives the read counter with a clock in whose otherwise regular edge pattern certain edges are lacking. The pattern of the lacking edges reflects the frame structure. A phase comparator forms the difference between the write and read addresses, of which the magnitude is monitored and if a threshold is transgressed or fallen short of a signal is applied to the control circuit as a sign that a positive or negative stuff bit is to be inserted into the frame (stuff request). The control circuit then inserts with the write clock an additional edge at a specific location of the frame or removes an edge from the sample used thus far.

At the receiver end of the transmission system after a plesiochronous demultiplexer a corresponding circuit arrangement can be switched for removing again the positive and negative stuff bits and for bringing the bit rate back to its original value. The removal of the stuff bits is again effected via a buffer memory in which the useful data are written. The reading operation controls a phase-locked loop for producing a clock frequency which is as uniform as possible (presents little jitter). By jitter is meant the deviation of the clock edges from their nominal value. Strict requirements are made on jitter suppression in accordance with CCITT Recommendation G. 823. High-frequency spectral portions in the jitter can be reduced at the receiver end by the low-pass phenomenon of the phase control loop. However, a randomly low-frequency spectral portion of the so-called stuff jitter (cf. the article by D. L. Duttweiler: Waiting Time jitter; Bell System Technical Journal 51, (1972), pp. 165 to 207) may develop, whose amplitude can be controlled or reduced respectively, only when stuffing is performed (thus at the transmitter end).

In order to reduce this jitter it is proposed in the article by Grover et al. to use sawtooth modulation for the threshold of the threshold detector.

SUMMARY OF THE INVENTION

It is an object of the invention to provide a circuit arrangement of the type above by means of which stuff jitter can be largely avoided by controlling the stuffing process at the transmitter end.

This object is achieved by means of the characteristic features described below. Advantageous embodiments will be discussed in the following text.

BRIEF DESCRIPTION OF THE DRAWING

The invention will be further explained with reference to the drawing Figures, in which.

DESCRIPTION OF THE PREFERRED EMBODIMENTS

The solution according to the invention is based on the following heuristic considerations:

As shown hereinbefore, with the cited state of the art the absolute magnitude of the difference between the counts of the write and read counters—also the phase difference between the two signals—is monitored and transmitted as a stuff request to the control circuit after it has passed through a threshold detector. This control circuit incorporates the stuff request as so-called stuff information in the frame of the higher bit rate signal. The threshold detector has two thresholds in the positive-zero-negative stuffing technique and can therefore transmit three individual signals that correspond to the values −1, 0, +1. With the positive-negative stuffing technique this circuit has only a single threshold and therefore produces only the value −1 or +1.

With the stuff information the receiver receives coarsely quantized information about the relative phase condition of the two signals at the transmitter end. Therefore, the threshold detector will hereinafter be termed quantizer because it performs a quantization of the phase difference.

If it were possible to give a more accurate indication of the relative phase condition, thus to perform a more accurate quantization and transmit the value thereof, the phase-locked loop could be influenced at the receiver end so that, for example, in the event of a positive stuff bit, this stuff bit could be removed at the receiver end without any low-frequency jitter being produced.

With these considerations the attention is focused at the quantization of the phase difference between the two signals at the transmitter end and gives rise to a more accurate investigation of the effects, for example, of the quantization error on the jitter.

Figure 1:
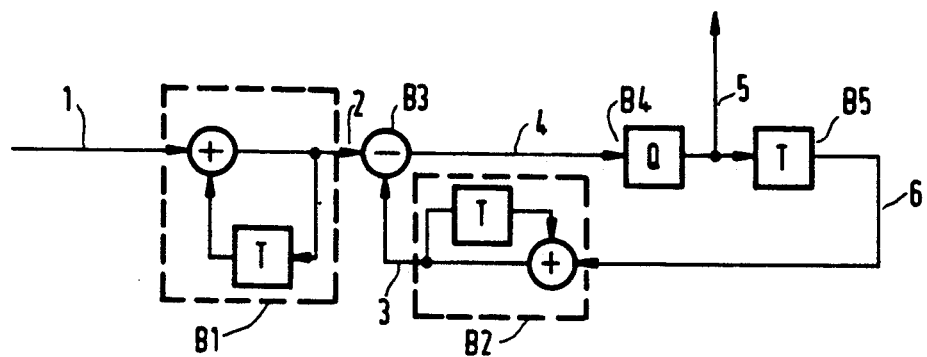
FIG. 1 shows an equivalent circuit diagram for a prior-art stuffing decision circuit.

For this purpose, the equivalent circuit diagram as shown in FIG. 1 is used. It shows the operation of the arrangement known from (I) from another angle. The circuit shown in FIG. 1 is clocked with a frame clock. On a line 1 the instantaneous stuffing rate is available. This is the number of bits that were to be inserted as stuff bits into the frames to realize the smallest possible phase difference between the two signals. As a rule they are fractions of bits which are continuously added together from one frame to the next by means of an accumulator B1 which comprises an adder and a delay element. From this addition the actually stuffed bits are subtracted by means of a subtractor B3. The actually stuffed bits per frame used for the phase correction of the two signals are applied from the output of an accumulator B2 to the subtractor B3. The accumulator B2 accumulates the phase corrections that have been made per stuff bit. The difference, i.e. the output signal of the subtractor B3, represents in a number the instantaneous phase condition of the two signals. This difference passes as stuff information through a quantizer B4 whose output signal is transmitted to the receiver over a line 5. Since the phase correction is effected at the receiver end only one frame later after the stuff information has been transmitted, the stuff information passes through a delay element B5 also at the receiver end, which element delays its input signal by one frame clock period.

Figure 2:
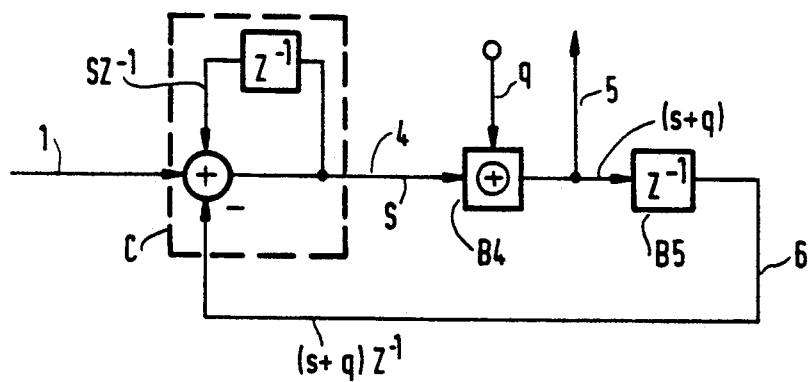
FIG. 2 shows the operation of the circuit as shown in FIG. 1 in the z-domain.

FIG. 2 shows the operation of the circuit as shown in FIG. 1 on the z-transform of all signals (for z transformation cf., for example, H. W. Schlüβler: Digitale Signalverarbeitung, Vol. 1, Springer Verlag Berlin, Heidelberg, New York, London, Paris, Tokyo 1988). The operational units B1, B2 and B3 of FIG. 1 are represented as regards their effect on the z-transform by means of a single operational unit C in FIG. 2, which unit comprises a summing element having three inputs, of which one input is inverted (sign inversion). The output of the summing element is connected to a non-inverting input via a delay element. The signal of the feedback loop 6 is applied to the non-inverting input and the input signal 1 is applied to the third input. The correspondence between the further operational units of FIG. 2 with those of FIG. 1 is shown by means of like reference characters.

In FIG. 2 the quantizer is copied by means of a linear model: A randomly accurate signal is superposed by an interference signal q whose effect is approximately equal to the quantization error and whose effect on the stuff jitter is to be reduced. If one determines the transmission function Hq in the z-domain, which function makes itself felt for the interference signal q for line 5 (over which the stuff information is transported) according as the input signal 1 disappears, one obtains:

$$Hq = \frac{z-1}{z} \quad (1)$$

The transmission path thus has a differentiating effect on the interference signal q. When a signal is differentiated, the spectral portions of small frequencies are reduced (due to the multiplication by the frequency) so that, in principle, the following way of suppressing the low-frequency portions in the stuff jitter is possible: the signal path for the interference signal q to the stuff information line 5 in FIG. 2 is changed in such a way that the signal is differentiated several times along this path and the low-frequency portions are more strongly suppressed than in the case of a single differentiation. As a result, the low-frequency portions in the stuff jitter are also suppressed as long as the stuff jitter is directly proportional to the low-frequency portion of the interference signal q.

Figure 3:
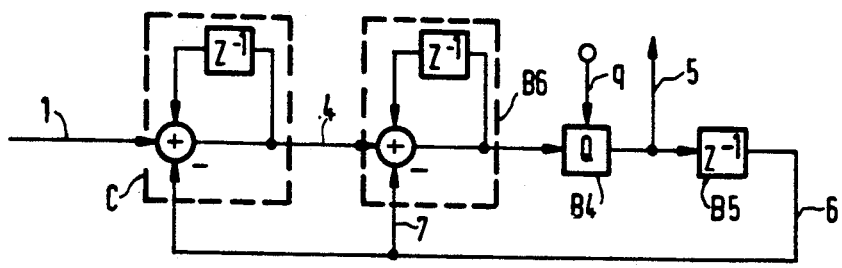
FIG. 3 shows the operation of a circuit according to the invention in the z-domain and FIG. 4 shows the basic circuit diagram of a circuit arrangement for bit rate adjustment according to the invention.

FIG. 3 represents such a modification of the circuit as shown in FIG. 2. It distinguishes itself from the one shown in FIG. 2 by an additional unit B6 which modifies the input signal of the quantizer B4. The unit B6 itself consists of a summing element having three inputs, one of which being an inverting input. To one non-inverting input the output signal of the unit C is applied, whereas the other non-inverting input is connected to the output of the summing element via a delay element. The output signal of the unit B5 is applied to the inverting input.

For the FIG. 3 the transmission function in the z-domain for the interference signal to line 5 has now the form of:

$$Hq = \frac{(z-1)^2}{z^2} \quad (2)$$

The arrangement differentiates the interference signal two times so that an increased suppression of the low-frequency stuff jitter may be expected. The arrangement can now be transformed into a circuit whose operational units work in the time domain and can be provided as a completion for a circuit having the characteristic features mentioned in the opening paragraph.

Figure 4:
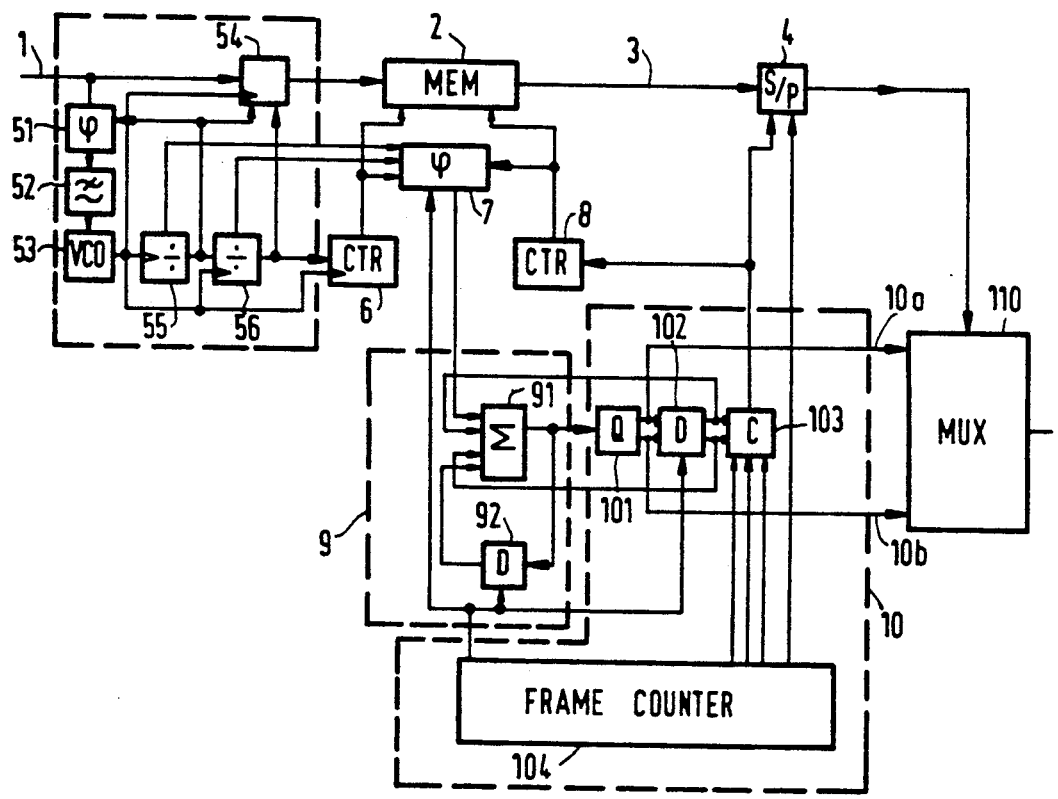

Such a circuit is shown in FIG. 4. Over a line 1 the signal is supplied with a rather low bit rate—in this case 2.048 Mbit/s—to the arrangement in the CMI code. An input circuit 5 converts the signal back from the line code into the binary code and produces the required clocks. The input circuit comprises a phase-locked loop with a phase comparator 51, an automatic control system 52, a clock means 53 comprising an oscillator, and with a counter 55 acting as a divider. A further counter 56 acting as a divider is connected to the divider 55. The clocks reduced by the counters or clock dividers 55 and 56 are applied to the decoder 54. The bit clock of the decoded signal is available at the output of divider 56 and used for incrementing a write counter 6. The write counter produces write addresses at which the bits of the input signal are stored in a buffer memory 2. The higher bit rate signal—in this example 2.304 mbit/s-serially departs from the buffer memory 2 over an output line 3. This signal comprises frame information, fixed stuff bits as well as positive or negative stuff bits (variable stuff bits). These bits are read out from the buffer memory 2 with the aid of a read counter 8 which produces the addresses for the reading operation. A control circuit 10 controls the operation of the read counter 8. If, for example, one bit more is to be inserted into the signal on line 3, the control circuit stops the read counter for one clock period. The control circuit comprises a quantizer 101, a delay element 102 having the delay of a frame period, a combining circuit 103 as well as a frame counter 104. The operation of the frame counter with its connected modules 101, 102 and 103 is further described in DE 39 42 883 and in DE 39 42 885.

A serial-to-parallel converter 4 which is also controlled by the control circuit 10 transports the higher bit rate signal byte by byte to a multiplexer 110.

A phase comparator 7 forms the difference between the counts of the write counter 6 and those of the read counter 8, thus the phase difference between the input and output signals of the buffer memory 2. Without the connections between the counters 55 and 56 to the phase comparator 7, the phase comparator determines an integer which denotes by how many bits the phase of the buffer memory input signal differs from that of the output signal at the time this difference is determined. In order to have a more precise number, the counts of the counters 55 and 56 representing as one the count of one counter are applied to the phase comparator 7, which counts are incremented with a considerably higher frequency than the clock frequency of the input signal. These high speed counters are used for determining the least significant digits, namely the digits after the decimal point, of the phase difference between the signal on line 1 and the signal on line 3. Over an output line of the phase comparator this exact phase difference is applied to a controller 9. The controller 9 comprises a summing element 91 as well as a delay element 92 having a delay of one frame period. The summing element has four inputs; the output signal of the delay element 92 being applied to one input, the output signal of the phase comparator 7 being applied to the other and the number of positive or negative stuff bits which are to be inserted into the higher bit rate signal at the next stuffing procedure being applied in binary form to the other two inputs. This number is positive for positive stuff bits and negative for negative stuff bits. The number is derived from the stuff request transported to the multiplexer 110 over lines 10a and 10b.

The output signal of the controller 9 is applied to a quantizer or threshold detector 101, at whose output the stuff information is available. In the present example it was assumed that stuff bits are inserted according to the positive-negative stuffing technique.

The automatic controller 9 Performs a transformation of the operational unit B6 of FIG. 3 from the z-domain to the time domain. The feedback over the line 7 of FIG. 3 is the feedback of the delay element 102 to the summing element 91.

In the signal transformations described it is not necessary to perform all transformations with discrete modules but they can be performed partly or in full by a signal processor whose programming is apparent once a circuit arrangement as shown in FIG. 4 is used as an example.

I claim:

1. A circuit arrangement for adjusting the bit rates of two signals of which the signal having a higher bit rate (3) is structured in frames, wherein the circuit arrangement comprises a buffer memory (2), a write counter and a read counter (6, 8) as well as a phase comparator (7) and a control circuit (10) for inserting positive or negative stuff bits between bits of the lower bit rate signal (1), which is an input signal, comprising:

means for determining the least significant digits, namely the digits after the decimal point, of the phase difference between the write and read counters (6, 8) and including an output of a further counter (55, 56) being coupled to the phase comparator (7), the circuit arrangement comprising a clock means (53) for clocking the further counter (55, 56) with a multiple of the bit clock of the lower bit rate signal; and an automatic control system for controlling the clock for the read counter (8) and comprising a controller (9) which is coupled to the output of the phase comparator (7), an input of the control circuit (10) being coupled to the output of the controller (9) and the controller being coupled to an output of the control circuit (10) for receiving information about the number of positive or negative bits to be stuffed at a next stuffing operation.

2. A circuit arrangement as claimed in claim 1, characterized in that the controller (9) comprises an accumulator whose summing element (91) is arranged for summing the output signal of the phase comparator (7) and the number of positive or negative bits to be stuffed.

* * * * *